US008705041B2

(12) United States Patent
Eckman et al.

(10) Patent No.: US 8,705,041 B2
(45) Date of Patent: Apr. 22, 2014

(54) COAXIAL INTERFEROMETER AND INSPECTION PROBE (75) Inventors: Ryan Elliot Eckman, Columbus, MN (US); Peter David Koudelka, St. Paul, MN (US); Lubomir Koudelka, Shoreview, MN (US)

(73) Assignee: Promet International, Inc., Shoreview, MN (US)

( * ) Notice: Subject to any disclaimer, the term of this patent is extended or adjusted under 35 U.S.C. 154(b) by 262 days.

(21) Appl. No.: 13/112,143

(22) Filed: May 20, 2011

(65) Prior Publication Data

US 2012/0133946 A1 May 31, 2012

Related U.S. Application Data (60) Provisional application No. 61/348,917, filed on May 27, 2010.

(51) Int. Cl.
*G01B 9/02* (2006.01)
*G01N 21/00* (2006.01)

(52) U.S. Cl.
USPC ............................................. 356/450; 356/73

(58) Field of Classification Search
USPC .................. 356/73, 450, 511; 359/370, 371
See application file for complete search history.

(56) References Cited

U.S. PATENT DOCUMENTS

| 2,612,074 | A | 9/1952 | Mirau |
| 3,028,782 | A | 4/1962 | Bernhardt et al. |
| 3,442,594 | A | 5/1969 | Minard et al. |
| 4,171,915 | A | 10/1979 | Hesselink |
| 4,594,003 | A | 6/1986 | Sommargren |
| 4,641,927 | A | 2/1987 | Prescott et al. |
| 5,093,719 | A | 3/1992 | Prescott |
| 5,220,405 | A | 6/1993 | Barbee et al. |
| 6,490,046 | B1 | 12/2002 | Drabarek et al. |
| 6,947,149 | B2 | 9/2005 | Kobayashi et al. |
| 6,970,253 | B2 * | 11/2005 | Lindner et al. ................. 356/511 |
| 7,095,507 | B1 * | 8/2006 | Hwang et al. .................. 356/512 |
| 7,236,251 | B2 * | 6/2007 | Takaoka ......................... 356/497 |
| 7,636,167 | B2 * | 12/2009 | Laguarta Bertran et al. . 356/511 |
| 7,876,446 | B2 * | 1/2011 | Korner et al. .................. 356/456 |
| 8,004,688 | B2 * | 8/2011 | Davidson et al. ............. 356/497 |

OTHER PUBLICATIONS

Nikon MicroscopyU, Principles and Applications of Two-Beam Interferometry, pp. 1-9, http://www.microscopyu.com/articles/interferometry/twobeam.html (last visited on May 18, 2011).

* cited by examiner

*Primary Examiner* — Michael A Lyons
(74) *Attorney, Agent, or Firm* — Leanne Taveggia Farrell; Westman, Champlin & Koehler, P.A.

(57) ABSTRACT

An optical probe has optical components of an interferometer and includes an optical axis, at least one optical source for emitting light along an illumination path that is at least partially coaxial with the optical axis, a first beam splitter and a first lens. The first beam splitter intersects the optical axis and splits the light from the at least one optical source into a first beam for traveling along a reference path that is coaxial with the optical axis to a reference surface and a second beam for traveling along a test path that is coaxial with the optical axis to a specimen. The first lens is interposed along the reference path.

19 Claims, 8 Drawing Sheets

COAXIAL INTERFEROMETER AND INSPECTION PROBE

CROSS-REFERENCE TO RELATED APPLICATION

The present application is based on and claims the benefit of U.S. provisional patent application Ser. No. 61/348,917, filed May 27, 2010, the content of which is hereby incorporated by reference in its entirety.

STATEMENT OF GOVERNMENT INTEREST

The U.S. Government has a paid-up license in this invention and the right in limited circumstances to require the patent owner to license others on reasonable terms as provided for by the terms of Contract No. N68335-09-C-0422 awarded by Naval Air Warfare Center.

BACKGROUND

Fiber optic cables can be used to transmit data signals in telecommunications systems, computer networks, aircraft instrumentation, and other high speed communications services. Standard connectors terminate a fiber centered inside a shaft, or ferrule, and mate two fiber endfaces together in contact or close proximity. The ferrules plug into a socket or instrument panel to be optically coupled. Efficient fiber optic coupling requires a high degree of cleanliness to be maintained. Debris can scatter and interrupt data signals, and even physically damage the fiber endface, which requires costly hardware replacement and reinstallation. In addition, with regular use, a fiber can delaminate and protrude or retract from the mating interface, which can cause loss of data signals on otherwise clean and undamaged endfaces.

Interferometric microscopes inspect and qualify the endfaces of fiber optic connectors for submicron level damage, contamination, surface geometry, and fiber protrusion. Interferometric capability is required to critically measure endface geometry and to detect protrusion or delamination between a fiber and its ferrule.

The discussion above is merely provided for general background information and is not intended to be used as an aid in determining the scope of the claimed subject matter.

SUMMARY

An optical probe has optical components for operating in an interferometer mode and in a microscope imaging mode. The optical probe includes an optical axis, at least one optical source for emitting light along an illumination path that is at least partially coaxial with the optical axis and a first beam splitter. The first beam splitter intersects the optical axis and splits the light from the at least one optical source into a first beam for traveling along a reference path that is coaxial with the optical axis to a reference surface and a second beam for traveling along a test path that is coaxial with the optical axis to a specimen. The first direction and the second direction are different.

The optical probe also includes a first lens interposed along the reference path between the reference surface and the first beam splitter and a second lens interposed between the first beam splitter and the specimen. The first lens provides a reference path for the first beam and the second lens provides a test path for the second beam. The first beam reflects off the reference surface and the second beam reflects off the specimen such that the two beams interfere along an imaging path that is coaxial with the optical axis.

The at least one optical source includes at least one first optical source configured to emit a first wavelength of light along at least a portion of the optical axis to operate the optical probe in the interference fringe imaging mode. The at least one optical source also includes at least one second optical source configured to emit a second wavelength of light different from the first wavelength of light along at least a portion of the optical axis to operate the optical probe in the microscope imaging mode.

This Summary is provided to introduce a selection of concepts in a simplified form that are further described below in the Detailed Description. This Summary is not intended to identify key features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a probe having optical components for operating in an interference fringe imaging mode to determine geometry and health of a fiber optic endface that is recessed into a socket terminus. A beam splitter intersects an optical axis of the interferometer in the probe to split light from an optical source into a first beam for traveling along a reference path that is coaxial with the optical axis and a second beam for traveling along a test path that is also coaxial with the optical axis. The first beam is reflected by a reference surface and the second beam is reflected by the fiber such that the first beam and the second beam interfere along an imaging path that is also coaxial with the optical axis.

Figure 1:
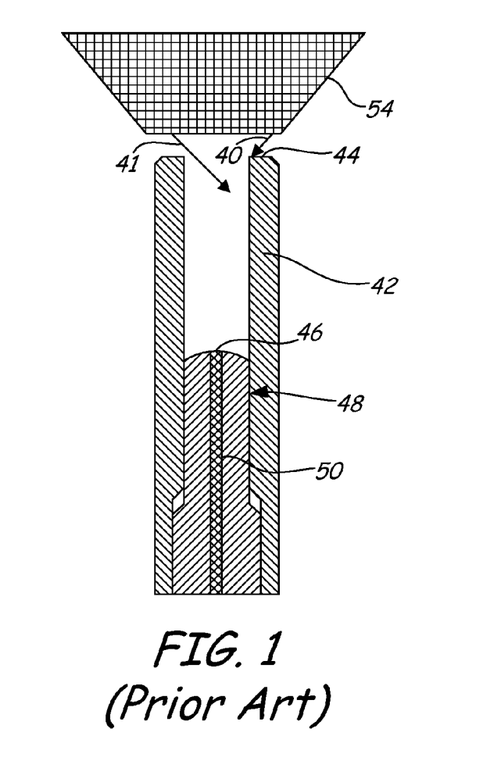
FIG. 1 illustrates a section view of a prior art inspection device attempting to inspect a ferrule.

In general, a fiber is plugged into an interference inspection device at the focal point and viewed or imaged for inspection. However, in many applications, fibers are already installed behind instrument or service panels in the field, i.e., in sockets or socket termini which are as small as 1.25 mm in diameter and up to 6 mm in depth, and cannot be readily accessed or removed for maintenance and inspection. As illustrated in the diagrammatic section view of FIG. 1, existing inspection devices, which include interferometric capabilities, have lenses or objectives, such as objective 54, that are large in size relative to the diameter of a socket terminus, such as socket terminus 42. Therefore, and in one example, imaging beam 40 cannot make clearance into socket 42 to inspect an endface surface 46 of fiber 50 located in a ferrule 48. As illustrated, imaging beam 40 is blocked at exterior 44 of socket 42. Blocking the beam in this manner makes the resolving power inadequate and unsuitable for the inspection. In another example, imaging beam 41 cannot focus deeply enough into socket 42 to reach endface surface 46.

While compact micro optic, fiber and/or gradient index microscope-type probes are commercially available for inspecting recessed fiber endfaces and other low diameter clearance microscopy or endoscopy applications, such existing devices are unable to generate interference fringes, and therefore have no interferometric capability, and cannot measure endface geometry or fiber protrusion.

A Michelson-based interferometer is one configuration for producing an interference fringe image (for acquiring 3D surface information) in optical interferometry. A fringe image or pattern is generated by splitting a beam of light from a light source (i.e. via an illumination path) into two beams along two different out-of-axis beam paths by a beam splitter (i.e., half mirror). One beam is directed onto a reference mirror (i.e., via the reference path) and the other onto the specimen (i.e., via the test path). The beams reflect from the reference mirror and the specimen and are made to interfere to form a two-beam interference fringe pattern that is viewed and/or captured by an image sensor (i.e. via an imaging path).

A Mirau-based interferometer has a high resolution objective that can acquire 3D information about a specimen by adding a beam splitter to the converging beam and a reference mirror on or near the objective. Splitting the beam requires one optical plate with a beam splitter coating and an additional compensation plate to match paths and enable interference. Interference fringes are present when the specimen with adequate reflection characteristics is placed at the focal plane of the objective. Mirau objectives are broadband interferometers where interference fringes can be removed from the raw images when the specimen is illuminated externally or back illuminated.

The coaxial location of the reference mirror in a Mirau objective is desirable for a compact configuration and stable interferometer. However, the focus is relatively close to the objective and therefore unsuitable for probe-based applications. Also, the interference field of view is limited to the diameter of the reference mirror which obscures and must be less than the diameter of the focusing beam exiting the lens objective. Another inherent constraint is that the working distance must be less than half of the focal distance of the lens objective to allow room for equal test and reference paths, in addition to fragile optical compensation plates near the specimen that could experience damage and debris.

The Linnik-based interferometer does not have the working distance constraint of the Mirau-based interferometer because its test and reference paths are not located between the microscope and specimen. Rather it contains lens objectives in each path with the reference path located off-axis and away from the test path. The first objective lens is interposed between the beam splitter and the reference mirror (i.e., in the reference path) and a second objective lens with an identical optical distance to the first objective lens is interposed between the beam splitter and the specimen (i.e., in the test path) for measuring minute details on a specimen.

With well-matched identical lens objectives the Linnik interferometer is able to achieve essentially zero optical path difference for interferometry and additionally compensate for spherical aberration and other optical aberrations. However, these objectives can be difficult to manufacture especially where complex identical lens objectives are required. In practice the Linnik arrangement is much larger in size and is mechanically less stable than the Mirau interferometer, making it even less suitable for compact, portable, or probe based optical devices.

Figure 2:
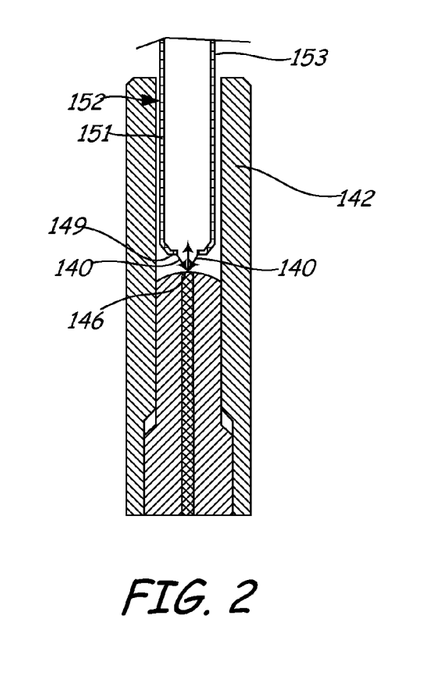
FIG. 2 illustrates a diagrammatic sectional view of a distal section of an optical probe located in a socket terminus under one embodiment.
Figure 3:
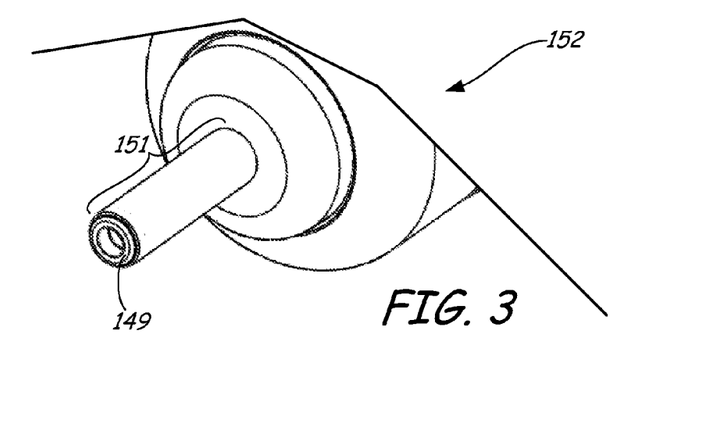
FIG. 3 is a perspective view of the distal section of the optical probe.

FIG. 2 illustrates a diagrammatic section view of a distal section 151 of an optical probe 152 located in a socket terminus 142 in accordance with embodiments of the disclosure. For simplicity, only a body 153 of optical probe 152 is illustrated in FIG. 2 and all internal optical components are omitted. FIG. 3 illustrates a perspective view of distal section 151 of optical probe 152 including distal end 149. Optical probe 152 achieves clearance into socket terminus 142 and can focus high numerical aperture or high resolution imaging beams 140 onto a fiber endface 146. Although not illustrated in FIG. 2, optical probe 152 includes optical components of an interferometer.

Figure 4:
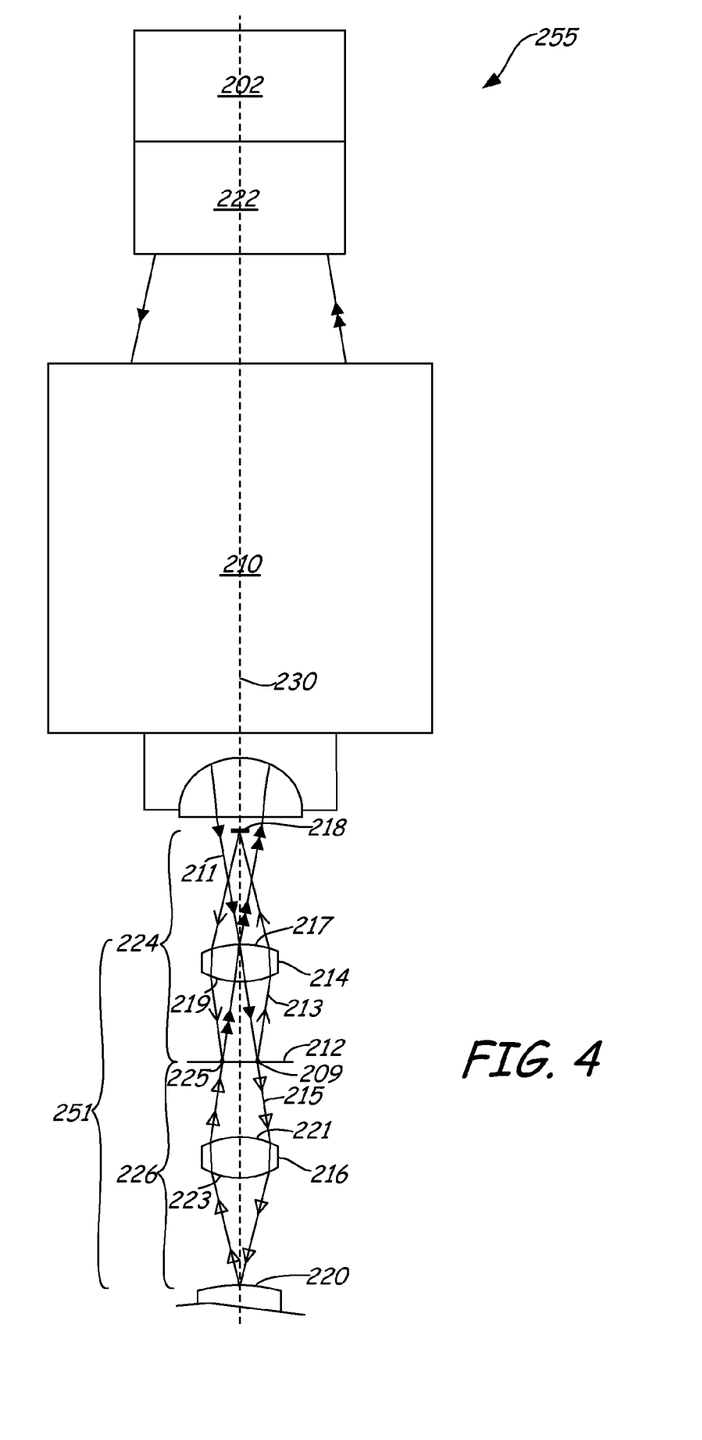
FIG. 4 illustrates a simplified schematic diagram of an interferometer that can be used in an optical probe for inspecting a specimen recessed in a socket terminus under one embodiment.

FIG. 4 illustrates a simplified schematic diagram of a coaxial two-beam interferometer 255 that can be used in an optical probe, such as optical probe 152, for inspecting a specimen 220, such as a fiber endface, recessed in a socket terminus in accordance with one embodiment. The grouping of components in interferometer 255 indicated at 251 are the components that are grouped together and housed in distal section 151 of optical probe 152. The coaxial two-beam interferometer 255 receives an input light beam 211 (illustrated schematically as single filled arrows) from an optical source 202. It should be realized that coaxial interferometer 255 can include any number of optical sources 202 including two or more optical sources. In addition, the optical source 202 of coaxial interferometer 255 need only include a coaxial or internal optical source 202. In other words, no external or back illumination is needed. However, the optical source(s) 202 may use monochromatic, narrow band or broadband illumination and can be coherent, partially coherent, or incoherent.

A beam splitter 212 splits input light beam 211 into two beams 213 and 215 at point 209. A first beam 213 (illustrated schematically as single lined arrows) follows a reference path 224 through a first lens 214, which is interposed in first beam 213, onto a reference surface or mirror 218. A second beam 215 (illustrated schematically as unfilled arrows) follows a test path 226 through a second lens 216, which is interposed in second beam 215, onto a specimen 220. The reference path 224 and the test path 226 are coaxial along optical axis 230 and therefore the two beams are considered to be coaxial.

First lens 214 and second lens 216 intersect with reference path 224 and test path 226, respectively, and therefore, also optical axis 230. A first side 219 of first lens 214 is spaced apart from a beam splitter 212 and a second opposing side 217 of first lens 214 is spaced apart from reference surface 218. Likewise, a first side 221 of second lens 216 is spaced apart from beam splitter 212 and a second opposing side 223 of second lens 216 is spaced apart from specimen 220.

After first beam 213 follows reference path 224 and second beam 215 follows test path 226, first beam 213 reflects from or bounces off the reference surface 218 and second beam 215 reflects from or bounces off specimen 220. The reflections of first beam 213 and second beam 215 combine and interfere (illustrated schematically as double filled arrows) at point 225 to form a two-beam interference fringe pattern for capture by an image sensor 222 along an imaging path. An image sensor can include an area or linear sensor array, photographic film, or the eye. The imaging path is defined as being coaxial with the optical axis 230 and running between specimen 220 and the image sensor 222.

The coaxial nature of the reference and test paths 224 and 226 provide interferometer 255 with rotational symmetry. Rotational symmetry allows minimum diameter clearance in a socket terminus that does not require perpendicular folds in the imaging or interference paths near the test surface. This enables close proximity between the high numerical aperture probe and recessed or environmentally restricted surfaces under test. First and second lenses 214 and 216 located in the test and reference paths 224 and 226 include substantially identical optical path lengths and can be lengthened and miniaturized to suit the form factor of a variety of different sizes of inspection probe applications. For example, first and second lenses 214 and 216 can be gradient index objective lenses. However, other types of lenses could be used including lenses having substantially identical optical path lengths, such as convex, concave, spherical or aspherical glass or plastic lenses. The coaxial nature of the reference and test paths 224 and 226 of interferometer 255 also offers a mechanically stable relationship between reference and test paths 224 and 226 because the beam splitter 212 and reference surface 218 are attached to or are in proximity to the imaging optics 210. Imaging optics 210 are additional fixed focus or zoom lenses used to magnify and focus an image of the specimen 220 on imaging sensor 222.

Figure 5:
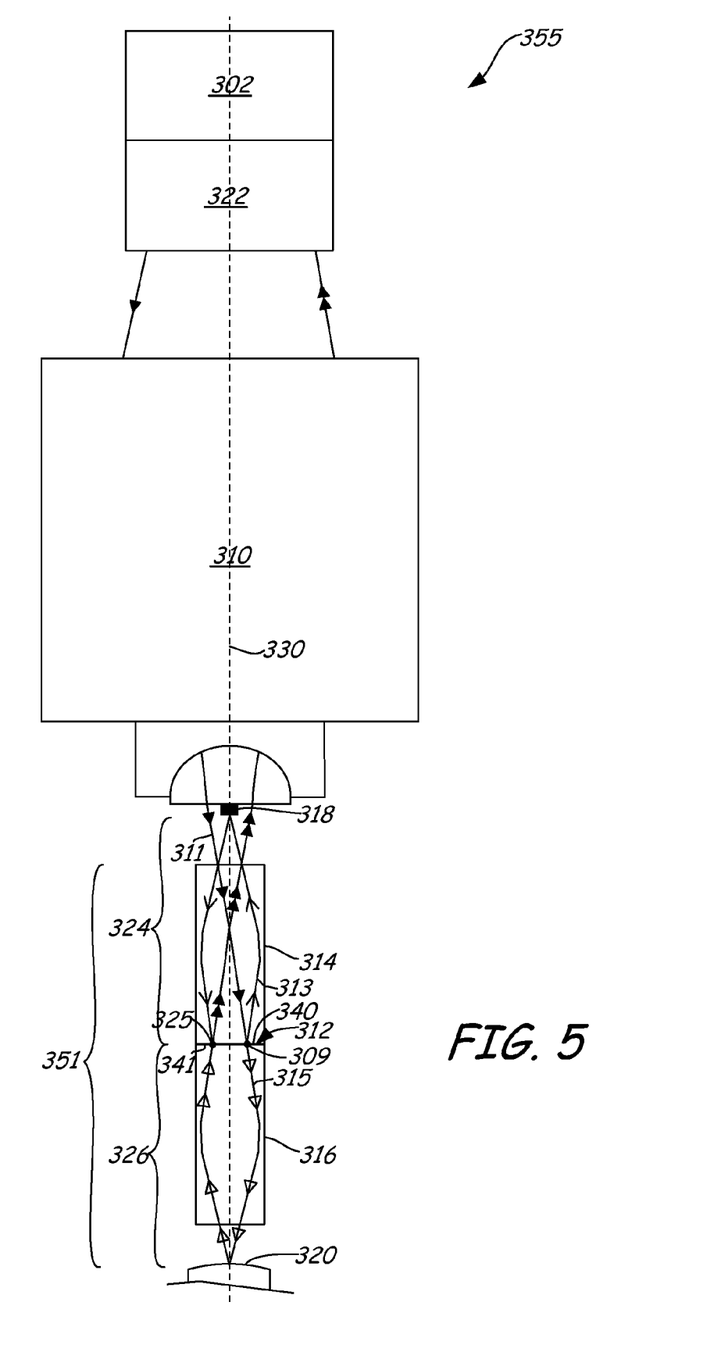
FIG. 5 illustrates a simplified schematic diagram of an alternative interferometer that can be used in an optical probe under another embodiment.

FIG. 5 illustrates a simplified schematic diagram of an alternative coaxial two-beam interferometer 355 that can be used in optical probe 152 under another embodiment. The grouping of components in interferometer 355 indicated at 351 are the components that are grouped together and housed in distal section 151 of optical probe 152. Like the coaxial two-beam interferometer of FIG. 4, the coaxial two-beam interferometer 355 of FIG. 5 includes a beam splitter 312 and receives an input light beam 311 (illustrated schematically as single filled arrows) from at least one optical source 302, which splits into two beams 313 and 315 at point 309. First beam 313 (illustrated schematically as single lined arrows) follows a reference path 324 through a first lens 314 onto a reference surface 318 and second beam 315 (illustrated schematically as single unfilled arrows) follows a test path 326 through a second lens 316 onto a specimen 320. Reference path 324 and test path 326 are coaxial with the optical axis 330 and therefore the two beams 313 and 315 are also coaxial. Similar to the first and second lenses described in FIG. 4, first and second lenses 314 and 316 intersect with the optical axis 330 and include substantially identical optical path lengths.

After first beam 313 follows reference path 324 and second beam 315 follows test path 326, first beam 313 reflects from or bounces off the reference surface 318 and second beam 315 reflects from or bounces off specimen 320. The reflections of first beam 313 and second beam 315 combine and interfere (illustrated schematically as double filled arrows) at point 325 to form a two-beam interference fringe pattern for magnification and focus by imaging optics 310 and capture by an image sensor 322 along an imaging path. The imaging path is defined as being coaxial with the optical axis 330 and running between specimen 320, and the image sensor 322.

Unlike the first and second lenses of the coaxial interferometer 255 illustrated in FIG. 4, both first lens 314 and second lens 316 of coaxial interferometer 355 are directly coupled to beam splitter 312. For example, first lens 314 can be adhered to a first side 340 of beam splitter 312 and second lens 316 can be adhered to an opposing second side 341 of beam splitter 312. In this embodiment, first lens 314 is still spaced apart from reference surface 318 and second lens 316 is still spaced apart from specimen 320, but not spaced apart from beam splitter 312.

In addition, unlike the coaxial interferometer illustrated in FIG. 4, reference surface 318 is attached to imaging components 310 by, for example, an adhesive. Such a configuration provides for more stability for the rotationally symmetric interferometer 355.

Figure 6:
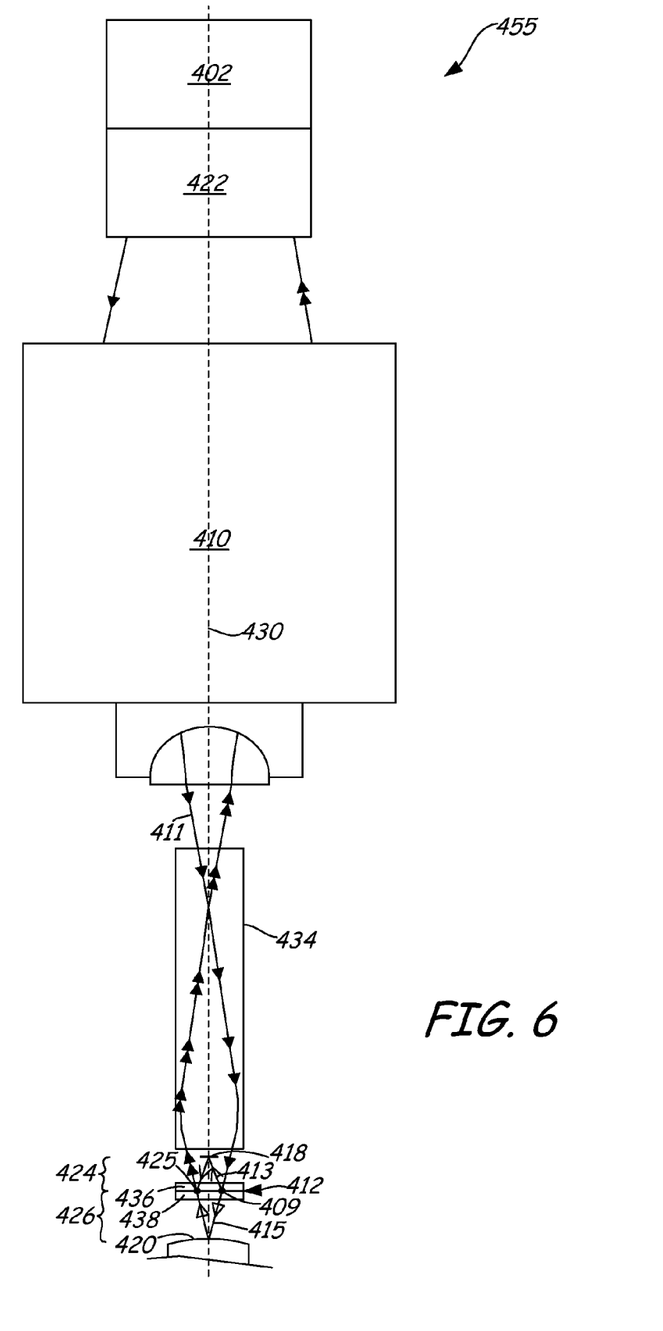
FIG. 6 illustrates a simplified schematic diagram of an alternative interferometer that can be used in an optical probe under yet another embodiment.

FIG. 6 illustrates a schematic diagram of an alternative coaxial two-beam interferometer 455 that can be used in optical probe 152 under yet another embodiment. In FIG. 6, a lens or lenses 434, such as a micro optical or gradient index lens, is interposed between imaging optics 410 and reference surface 418. Interposed between reference surface 418 and specimen 420 is a beam splitter 412. In FIG. 6, splitting an input light beam 411 (illustrated schematically as single filled arrows) from at least one optical source 402 includes using an optical plate 436 with a beam splitter coating and an additional compensation plate 438 to match paths and enable interference. The imaging optics 410 focus input beam of light 411 into lens or lenses 434 and optical beam splitting plates 436 and 438 split the beam of light into two beams 413 and 415 at point 409. First beam 413 (illustrated schematically as single lined arrows) is directed onto reference surface 418 and second beam 415 (illustrated schematically as single unfilled arrows) is directed onto specimen 420. Such an interferometer configuration operates with no or negligible optical focusing power located between the lens or lenses 434 and the specimen 420.

After first beam 413 follows reference path 424 and second beam 415 follows test path 426, first beam 413 reflects from or bounces off the reference surface 418 and second beam 415 reflects from or bounces off specimen 420. The reflections of first beam 413 and second beam 415 combine and interfere (illustrated schematically as double filled arrows) at point 425 to form a two-beam interference fringe pattern for magnification and focus by imaging optics 410 and capture by an image sensor 422 along an imaging path. The imaging path is defined as being coaxial with the optical axis 430 and running between specimen 420 and the image sensor 422.

Figure 7:
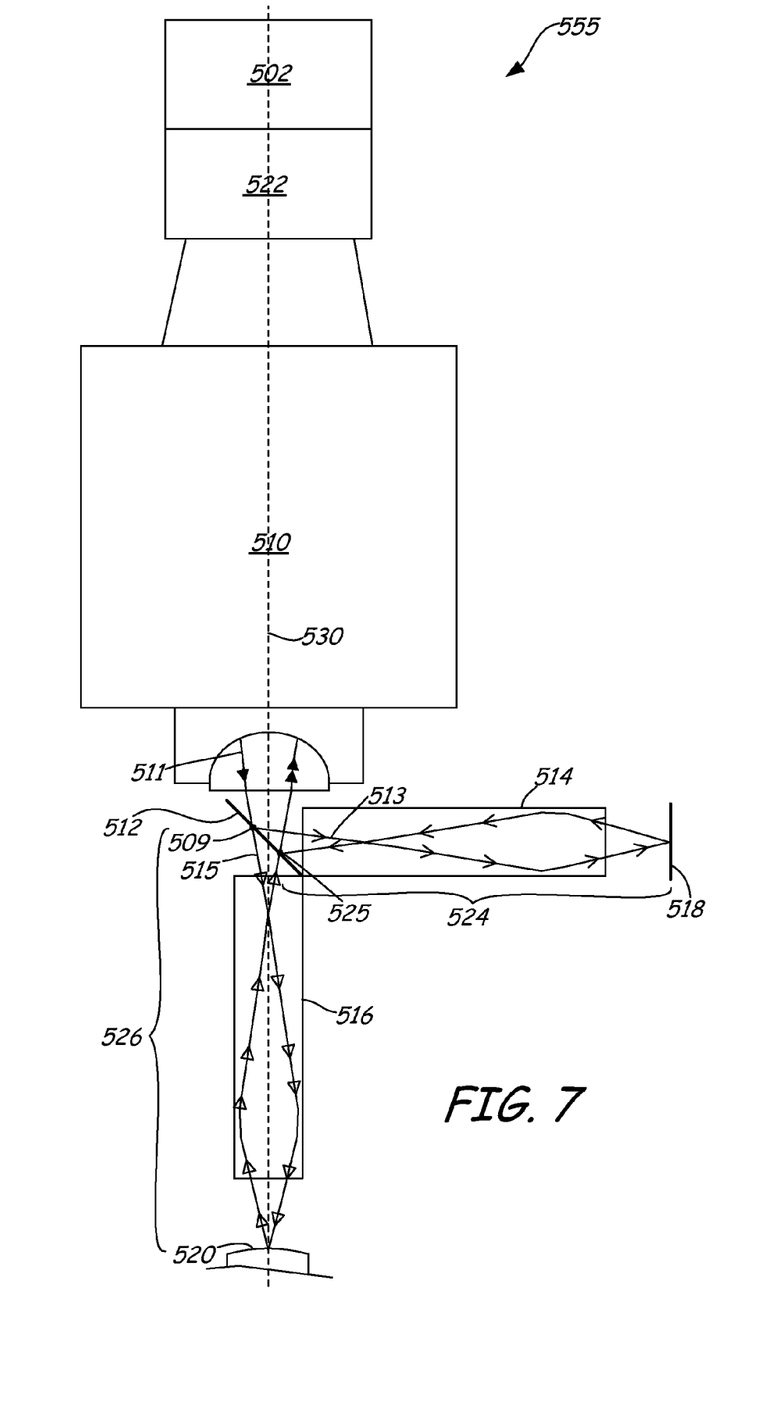
FIG. 7 illustrates a simplified schematic diagram of an alternative interferometer that can be used in an optical probe under yet another embodiment.

FIG. 7 illustrates a schematic diagram of an alternative interferometer 555 that can be used in optical probe 152 under yet another embodiment. FIG. 7 includes a beam splitter 512, such as a beam splitter cube or beam splitter plate oriented at about 45 degrees, that receives an input light beam 511 (illustrated schematically as single filled arrows) from at least one optical source 502 along an optical axis 530 and splits input light beam 511 into two beams 513 and 515 at point 509. First beam 513 (illustrated schematically as single lined arrows) follows a reference path 524 through a first lens 514 onto a reference surface 518 and second beam 515 (illustrated schematically as single unfilled arrows) follows a test path 526 through a second lens 516 onto a specimen 520. While first lens 514 and second lens 516 can be long gradient index lenses suitable for probe application and have substantially identical optical path lengths, first lens 514 and second lens 516 are not coaxial and reference surface 518 does not obscure the beam. Therefore, reference surface 518 is not restricted in size.

After first beam 513 follows reference path 526 and second beam 515 follows test path 524, first beam 513 reflects from or bounces off the reference surface 518 and second beam 515 reflects from or bounces off specimen 520. The reflections of first beam 513 and second beam 515 combine and interfere at point 525 (illustrated schematically as double filled arrows) to form a two-beam interference fringe pattern for magnification and focus by imaging optics 510 and capture by an image sensor 522 along an imaging path. The imaging path is defined as being coaxial with the optical axis 530 and running between specimen 520 and the image sensor 522.

Figure 8:
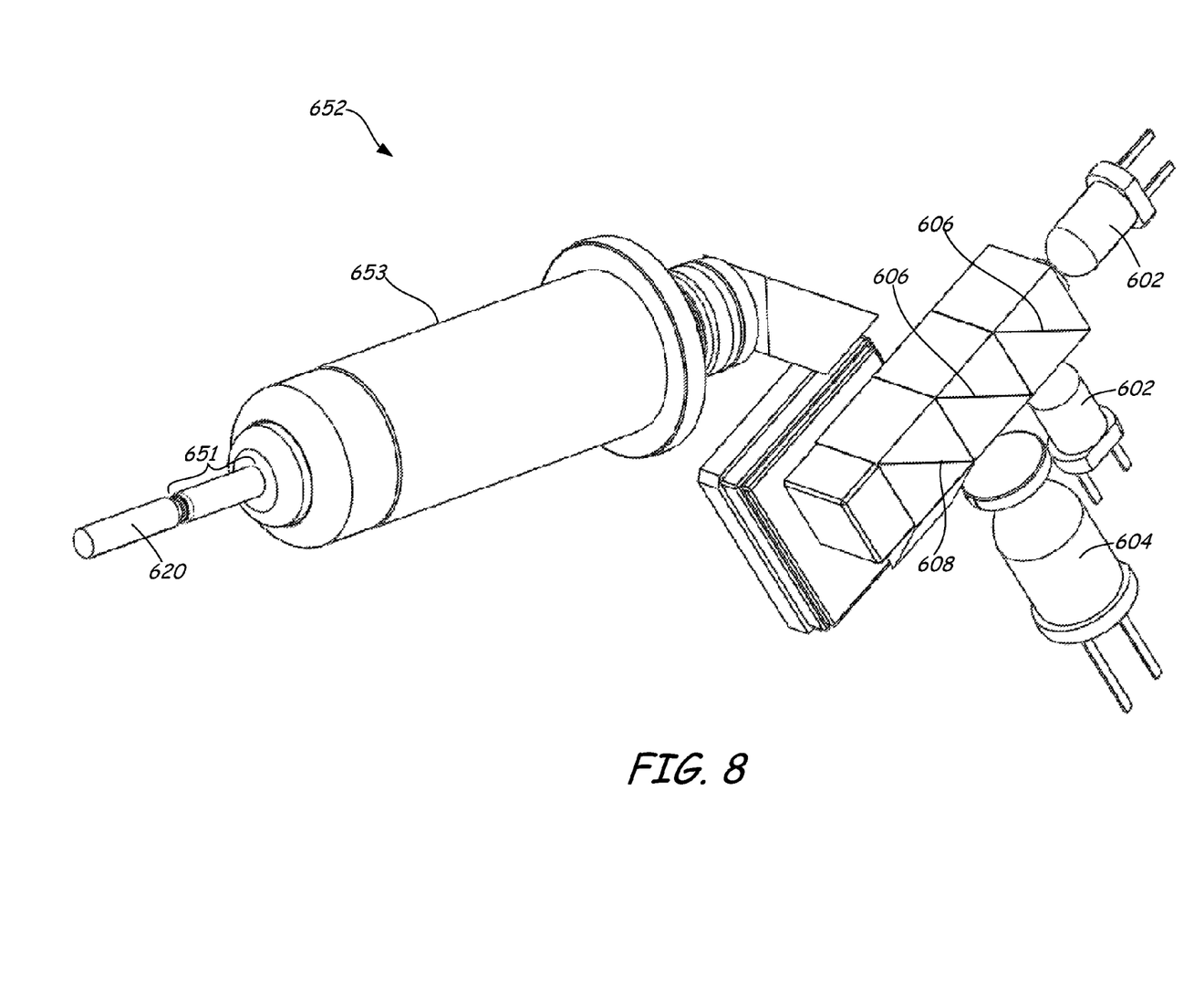
FIG. 8 illustrates a perspective view of an optical probe under one embodiment.
Figure 9:
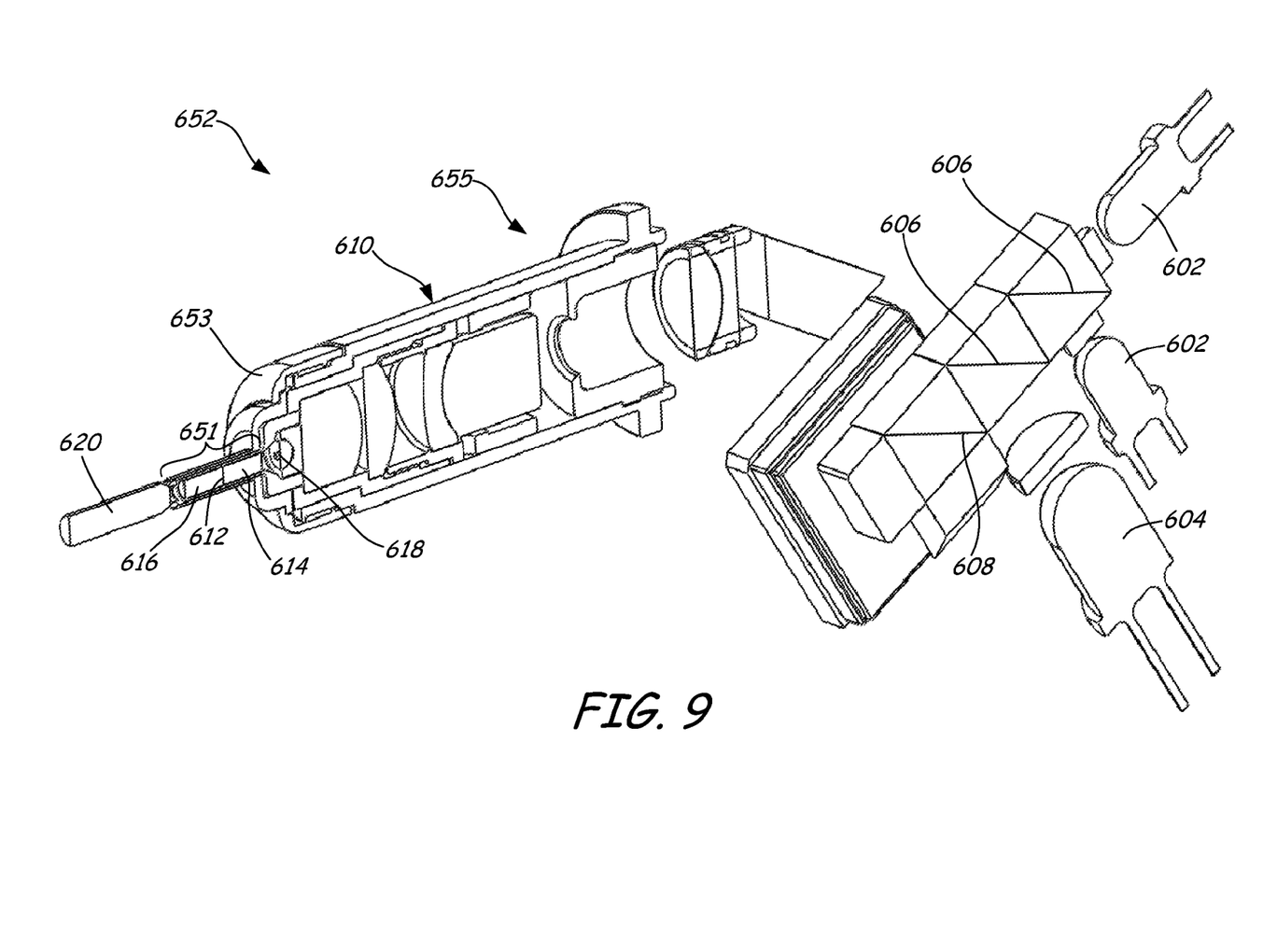
FIG. 9 is a perspective sectional view of the optical probe illustrated in FIG. 8.
Figure 10:
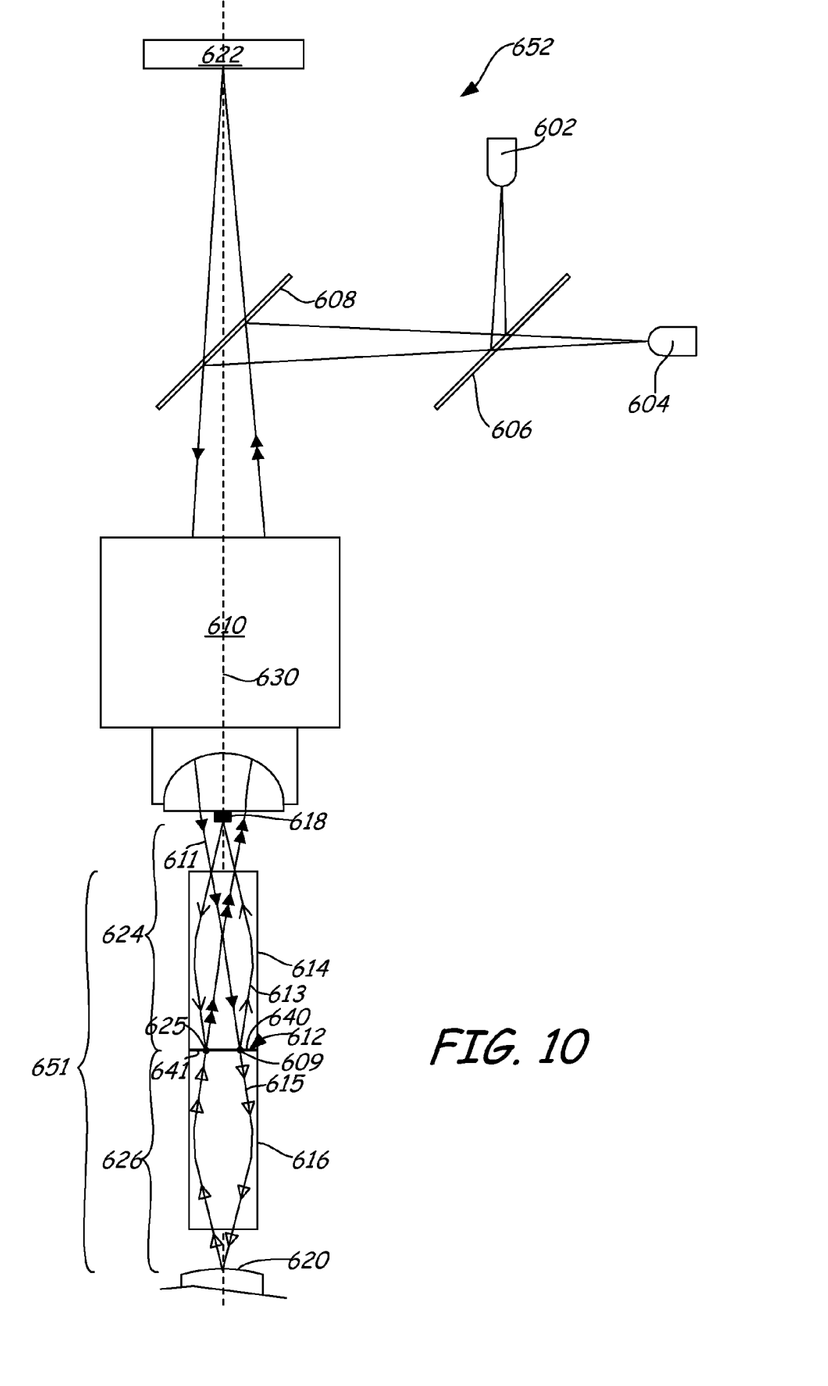
FIG. 10 is a simplified schematic diagram of the optical probe illustrated in FIGS. 8 and 9.

FIG. 8 illustrates a perspective view of an optical probe 652 having a body 653 and also illustrates a specimen 620. FIG. 9 is a perspective sectional view of the optical probe 652 and specimen 620 illustrated in FIG. 8. FIG. 10 is a simplified schematic diagram of the optical probe 652 illustrated in FIGS. 8 and 9. The grouping of components in probe 652 that are indicated at 651 in the schematic diagram illustrated in FIG. 10 are the components that are grouped together and housed in distal section 651 of optical probe 652 illustrated in FIGS. 8 and 9.

Optical probe 652 includes a coaxial two-beam interferometer 655. More particularly, optical probe 652 includes optical components that provide a microscope image mode and an interference fringe image mode. To switch between a microscope image mode and an interference fringe image mode, probe 652 includes dichroic or multi-wavelength function and switches with no moving parts and no external illumination source. Such multi-mode probe 652 includes front focal distance and field of view that are large relative to the lens diameter.

The interference fringe image mode of probe 652, and therefore interferometer 655, uses a first beam splitter 612. Like the interferometers illustrated in FIGS. 4-5, a first beam splitter 612 is located between two lenses 614 and 616, such as two gradient index objective lenses, having substantially identical optical path lengths. More specifically, like the interferometer illustrated in FIG. 5, both first lens 614 and second lens 616 are directly coupled to first beam splitter 612. For example, first lens 614 can be adhered to a first side 640 of beam splitter 612 and second lens 616 can be adhered to an opposing second side 641 of beam splitter 612. However, as described in other embodiments, other configurations of first beam splitter 612 are possible.

In interference fringe mode, light from first optical source or sources 602 is combined at a second beam splitter plate or cube or second beam splitter plates or cubes 606, and folds or directs the combined light at a third beam splitter plate or cube 608. Third beam splitter intersects with the optical axis 630. While probe 652 in FIGS. 8-9 illustrate first optical source 602 as having two optical sources, which would need to be combined at second beam splitter or splitters 606, first optical source 602 can also be a single optical source 602 as illustrated in FIG. 10. While probe 652 in FIGS. 8-9 illustrate two second beam splitters 606, second beam splitter 606 can be a single beam splitter 606 as illustrated in FIG. 10. Imaging components 610 (i.e. lenses or lens objectives) pass input illumination 611 to the first beam splitter 612 through first lens 614. First beam splitter 612 splits input illumination 611 into two beams 613 and 615 at point 609. The first beam 613 (illustrated schematically as single lined arrows) follows a reference path 624 through a first lens 614 onto a reference surface 618 and the second beam 615 (illustrated schematically as single unfilled arrows) follows a test path 626 through a second lens 616 onto a specimen 620. The reference path 624 and the test path 626 are coaxial with the optical axis 630 and therefore the two beams 613 and 615 are also coaxial. Reference surface 618 is located on the same optical axis 630 and is attached to the imaging optics 610.

After first beam 613 follows reference path 624 and second beam 615 follows test path 626, first beam 613 reflects from or bounces off the reference surface 618 and second beam 615 reflects from or bounces off specimen 620. The reflections of first beam 613 and second beam 615 combine and interfere at point 625 (illustrated schematically as double filled arrows) to form a two-beam interference fringe pattern for magnification and focus by imaging optics 610 and capture by an image sensor or area array detector 622 along an imaging path. The imaging path is defined as being coaxial with the optical axis 630 and running between specimen 620 and the image sensor 622.

When first optical source or sources 602 is turned on, a first wavelength of light is emitted. For example, first optical source or sources 602 can emit red or orange light. As light travels to specimen 620, the dichroic coating on first beam splitter 612 allows the light to split into two substantially equal beams, utilizing both test path 626 and reference path 624, and interference takes place. Since interference fringes are present, optical probe 652 is working in interference mode. Optical probe 652 also includes a second optical source or sources 604. Second optical source or sources 604 is configured for use when optical probe 652 operates in a microscope imaging mode. When first optical source or sources 602 is turned off and second optical source or sources 604 is turned on, it emits a second wavelength of light. For example, second optical source or sources 604 can emit blue light. As light travels to specimen 620, instead of light being split at first beam splitter 612, a dichroic coating on first beam splitter 612 ensures that substantially all of the blue light travels through first beam splitter 612 with high transmission and substantially fails to reflect light to reference surface 618 via reference path 624. Since a reflection from reference surface 618 is required for interference to take place, there is no interference fringes present and only test path 626 is utilized. As a result, a microscope image is generated and optical probe 652 is working in microscope mode. Therefore, optical probe 652 is able to switch between microscope mode and interference mode using at least two different wavelengths of light and without using shutters or other moving parts.

The microscope image can comply with known standards and be capable of imaging to sensor array 622 at a magnification of the order of several pixels per micron with sufficient contrast to image submicron defects. This requires diffraction limited or near diffraction limited performance using 0.2 or higher object space numerical aperture. Because complete inspection of fiber optic endface health requires imaging with and without interference fringes, and external illumination is undesirable or unavailable, an internal illumination scheme is designed where interference fringes are present using one waveband and absent with another. This dual waveband illumination approach can qualify surface defects and 3D conditions separately, as in current state of the art endface inspection practices, but without moving parts such as shutters, or bulky off-axis sources for oblique illumination.

Optical probe 652 consists of a combination of gradient index lenses 614 and 616 having substantially identical optical path lengths, custom or off-the-shelf lenses and magnification optics 610, and beam splitters 606 and 608 that allow a light source or a plurality of light sources 602 and 604 to illuminate the test surface. An image sensor array 622 captures the image and displays features of the specimen 620. Submicron resolution can be achieved.

Gradient index lenses offer one millimeter diameters and sufficiently high numerical apertures (NA), and various lengths ideally suited for small diameter high aspect ratio socket clearance. In addition, the surface quality of the gradient index lens is sufficient to receive a dichroic half mirror or beam splitter coating for first beam splitter 512. This surface transmits and reflects the red and orange wavebands at 50% to create interference fringes (interference mode), while efficiently transmitting the blue waveband for simple imaging (microscope mode). The gradient index lenses transfer the image to a series of zoom lenses where aberrations are corrected and magnification is set or adjusted for the image.

In regards to image sensor array 622, magnification can be discretely varied by electronically switching the format of the sensor array (digital zoom) 622, allowing a fixed or non-zoom optical system with no moving parts.

In regards to optical sources 602 and 604, a Kohler illumination scheme projects the red, orange, and blue light sources on the object with uniform intensity. These light sources can be placed near the image sensor array 622 where a broadband 50/50 third beam splitter plate or cube 608 separates the illumination source paths from the optical path along optical axis 630. An additional dichroic beam splitter plate or cube or beam splitter plates or cubes 606 allow the red, orange and blue wavebands to be delivered into the illumination path by multiple separate light sources or a single light source. These can be electronically switched on and off enabling a fringe imaging mode or a microscope imaging mode.

First beam splitter 612 consists of optical coatings applied to a substantially flat glass or polymer surface. When a series of dielectric coatings are applied in a calculated manner, the reflection and transmission characteristics of that surface can vary in intensity and can vary for different wavelengths of light incident on that surface. The coating is said to be dichroic if it behaves differently for one wavelength than it does for another. For a first wavelength of light and additional wavelengths of light, the coating transmits and reflects 50% at the beam splitter surface 612. The interference fringe contrast is maximized when the test and reference beams have equal intensity. While the dichroic beam splitter ensures this is the case for the interference waveband, the reflectivity of the object and reference mirror should also be equal. For a second wavelength of light, first beam splitter 612 efficiently transmits that wavelength of light and the device works in microscope mode.

In one embodiment, reference surface 618 has a reflection coefficient substantially equivalent to the specimen. For example, if the specimen is a fiber optic endface having a 4% Fresnel reflection coefficient, then the reference surface also has a 4% Fresnel reflection coefficient for equal intensity. As illustrated in FIGS. 8-10, the reference surface 618 is coaxially located inside the optical system so its reflection, transmission and absorption coefficients are critical to proper function. In one embodiment, the substrate of reference surface 618 is selected to absorb the non-reflected portion of the beam by using an opaque absorptive filter glass material. Absorption of the unreflected portion of the beam stops it from reaching the sensor array 622 and significantly saturating it with intense background illumination.

Similarly, when light is incident on the endface of a fiber optic connector, the vast majority of the light is transmitted and couples into the fiber core. This is an inherent drawback to coaxial illumination of a fiber optic endface, as the coupled light efficiently transmits along the length of the fiber to its opposite endface. There it undergoes a 4% reflection, and returns to the endface under test where it transmits to the sensor array as part of the image. This causes the fiber core to appear brighter than the background, similar in appearance to the defects or debris such devices are designed to detect, and produce a spurious signal.

Under one embodiment, the illumination scheme illustrated in FIGS. 8-10 can prevent low numerical aperture (NA) or low incidence angles of light from reaching the specimen 620 or fiber endface by selecting a proper light source or position. Also, a central obscuration can be placed in the illumination path or imaging optics 610 to block or attenuate such rays from reaching the specimen 620. In one embodiment, the reference surface 618 can also serve as a central obscuration in the imaging path. By proper selection of its size or diameter, it is used to block such rays and reduce or remove this spurious artifact. For example and under one embodiment, the size or diameter of the reference surface is selected based on a function of the numerical aperture (NA) of the fiber. The coaxial location of the reference surface 618 performs a specific function in microscope mode as well as in fringe mode, without being visible in the image or reducing the cutoff resolution frequency of the imaging system it partially obscures.

The diameters of the light sources used for fringe mode are restricted to match the diameter of the reference surface 618 upon magnification. This maximizes the area where fringes are visible on the object, and prevents unwanted light from leaking around the reference surface 618 and reaching the sensor array 620 without first undergoing interference.

The most cost effective optical design maximizes versatility by using one customized prescription of imaging optics for a variety of measurement tasks. The optics can be mechanically repackaged to suit each type of connector terminus using interchangeable probe bodies. The preferred interchangeable optical portion of the probe includes the identical lens objectives and beam splitter surface (i.e., the distal section 651 of probe 652). For example if the socket 142 in FIG. 2 had a larger or smaller diameter, the parts located in the test path 626 and reference path 624 in FIGS. 8-10 can be detached and switched in the field to suit the application. This interchangeable tip or distal section 651 includes parts 612, 614, and 616.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Beside inspection of fiber endfaces, various other ways to apply the disclosed embodiments are possible. For example, interference microscopy for light sensitive or environmentally restricted materials or biomaterials, in-situ interference microscopy where test tubes, capillary tubes or extraction is required to prepare samples for microscopy, and for interference probes, interference endoscopy, and immersion microscopy.

What is claimed is:

1. An optical probe comprising:
   an optical axis;
   at least one optical source for illuminating light along the optical axis and providing an input light beam;
   a first beam splitter intersecting with the optical axis and configured to split the input light beam from the at least one optical source into a first beam and a second beam, the first beam being directed in a first direction along the optical axis to a reference surface intersecting the optical axis and the second beam being directed in a second direction along the optical axis to a specimen that intersects the optical axis, wherein the first direction and the second direction are different;
   a first lens interposed between the reference surface and the first beam splitter and intersecting the optical axis, wherein the first lens provides a reference path for the first beam: and a second lens interposed between the first beam splitter and the specimen and intersecting the optical axis, wherein the second lens provides a test path for the second beam; and wherein the first lens and the second lens are attached to the first beam splitter.

2. The optical probe of claim 1, wherein the first lens and the second lens have substantially identical optical path lengths.

3. The optical probe of claim 1, further comprising:
a second beam splitter configured to combine light from the at least one optical source when the at least one optical source includes more than one optical source; and
a third beam splitter intersecting with the optical axis and configured to direct the combined light along the optical axis to provide the input light beam.

4. The optical probe of claim 1, wherein the first lens intersects with the optical axis and comprises a first side and a second side, the first side being spaced apart from the reference surface and the second side being spaced apart from the first beam splitter.

5. The optical probe of claim 4, wherein the second lens comprises a first side and a second side, the first side being spaced apart from the first beam splitter and the second side being spaced apart from the specimen.

6. The optical probe of claim 1, wherein the first lens intersects with the optical axis and is directly coupled to a first side of the first beam splitter.

7. The optical probe of claim 6, wherein the second lens is directly coupled to a second side of the first beam splitter.

8. An optical probe comprising:
a main body;
a distal section protruding from the main body that has a smaller width than the width of the main body, wherein at least a portion of the distal section is configured to fit within a socket terminus when inspecting an optical specimen that is located in the socket terminus;
an optical axis;
at least one optical source located internal to the main body but outside of the distal section, the at least one optical source emits light along an illumination path that is at least partially coaxial with the optical axis for operation of the optical probe in an interference imaging mode and for operation of the optical probe in a microscope mode;
a first beam splitter located in the distal section and intersecting the optical axis, the first beam splitter configured to split the light from the at least one optical source into a first beam for traveling along a reference path to a reference surface located internal to the main body but outside of the distal section and a second beam for traveling along a test path that is coaxial with the optical axis to a specimen wherein the first beam reflects off the reference surface and the second beam reflects off the specimen during interference imaging mode such that the first and the second beams interfere along an imaging path that is coaxial with the optical axis.

9. The optical probe of claim 8, further comprising a first lens interposed along the reference path between the reference surface and the first beam splitter and intersecting the optical axis, wherein the first lens is located in the distal section of the optical probe that is configured to fit within a socket terminus.

10. The optical probe of claim 9, further comprising a second lens interposed along the test path between the first beam splitter and the specimen and intersecting the optical axis.

11. The optical probe of claim 10, wherein the second lens is located in the distal section of the optical probe that is configured to fit within a socket terminus.

12. The optical probe of claim 8, wherein the reference surface comprises a diameter that is a function of a numerical aperture of the specimen.

13. The optical probe of claim 8, wherein the at least one optical source comprises at least one first optical source configured to emit a first wavelength of light along at least a portion of the optical axis to operate the optical probe in the interference fringe imaging mode.

14. The optical probe of claim 13, wherein the at least one optical source comprises at least one second optical source configured to emit a second wavelength of light different from the first wavelength of light along at least a portion of the optical axis to operate the optical probe in the microscope imaging mode.

15. The optical probe of claim 14, wherein the first beam splitter comprises a dichroic coating that is configured to reflect at least a portion of the first wavelength of light, but allow substantially the entire second wavelength of light to pass through.

16. An optical probe comprising:
an optical axis;
at least one first optical light source configured to selectively emit a first wavelength of light along at least a portion of the optical axis to operate the optical probe in an interference fringe imaging mode;
at least one second optical light source configured to selectively emit a second wavelength of light different from the first wavelength of light along at least a portion of the optical axis to operate the optical probe in a microscope imaging mode; and
a first beam splitter intersecting the optical axis and including a dichroic coating;
wherein the first beam splitter is configured to split the light from the at least one first optical source into a first beam for traveling along a reference path to a reference surface and a second beam for traveling along a test path to a specimen, the first beam reflecting off the reference surface and the second beam reflecting off the specimen such that the first and the second beams interfere along an imaging path that is coaxial with the optical axis to produce fringe images in the interference fringe imaging mode; and
wherein the first beam splitter allows substantially the entire second wavelength of light to pass through to illuminate the specimen in the microscope imaging mode.

17. The optical probe of claim 16, further comprising a gradient index lens interposed between the at least one first optical light source or the at least one second optical light source and the reference surface.

18. The optical probe of claim 16, further comprising a first lens interposed along the reference path between the reference surface and the first beam splitter and a second lens interposed between the beam splitter and the specimen, the first lens providing the reference path for the first beam and the second lens providing the test path for the second beam.

19. The optical probe of claim 18, wherein the first lens and the second lens comprise gradient index lenses.

* * * * *